(12) United States Patent
Heyne et al.

(10) Patent No.: US 11,691,527 B2
(45) Date of Patent: Jul. 4, 2023

(54) DEHUMIDIFIER MEANS AND A CHARGING STATION COMPRISING THE SAME

(71) Applicant: Dr. Ing. h.c. F. Porsche Aktiengesellschaft, Stuttgart (DE)

(72) Inventors: Raoul Heyne, Wiernsheim (DE); Florian Joslowski, Leinfelden-Echterdingen (DE); Matthias Bohner, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 156 days.

(21) Appl. No.: 17/315,375

(22) Filed: May 10, 2021

(65) Prior Publication Data

US 2021/0354580 A1    Nov. 18, 2021

(30) Foreign Application Priority Data

May 13, 2020  (DE) ...................... 10 2020 112 925.4

(51) Int. Cl.
| | | |
|---|---|---|
| *B01D 53/00* | (2006.01) | |
| *B60L 53/302* | (2019.01) | |
| *B01D 53/26* | (2006.01) | |

(52) U.S. Cl.
CPC .......... *B60L 53/302* (2019.02); *B01D 53/265* (2013.01); *B01D 2257/80* (2013.01)

(58) Field of Classification Search
CPC ............................ B01D 53/002; B01D 53/265; B01D 2257/80; B60L 53/30; B60L 53/302; B60L 53/31; F24F 13/222; Y02T 10/70; Y02T 10/7072; Y02T 90/12

See application file for complete search history.

(56) References Cited

U.S. PATENT DOCUMENTS

| | | |
|---|---|---|
| 5,884,486 A | 3/1999 | Hughes et al. |
| 6,250,083 B1 | 6/2001 | Chou |
| 10,081,262 B2 | 9/2018 | Nagel et al. |
| 10,202,046 B2 | 2/2019 | Köhler et al. |
| 2018/0160568 A1* | 6/2018 | Feddersen .............. G05D 22/02 |
| 2019/0255961 A1 | 8/2019 | Heyne et al. |

FOREIGN PATENT DOCUMENTS

| | | |
|---|---|---|
| DE | 3313711 A1 | 10/1984 |
| DE | 102007042998 A1 | 3/2009 |
| DE | 102015112347 A1 | 2/2017 |
| DE | 102018103706 A1 | 8/2019 |
| EP | 3257701 A2 | 12/2017 |
| WO | WO 2012072078 A1 | 6/2012 |
| WO | WO 2016198088 A1 | 12/2016 |

* cited by examiner

*Primary Examiner* — Sharon Pregler
(74) *Attorney, Agent, or Firm* — Leydig, Voit & Mayer, Ltd.

(57) ABSTRACT

A dehumidifier means includes: an electrothermal converter element; and a collecting container, arranged beneath the electrothermal converter element, for collecting condensate forming thereon, the collecting container having a drain through which the condensate from the collecting container is dischargeable out of the dehumidifier means. In an embodiment, the dehumidifier means includes a support plate on which a holding frame is arranged. The electrothermal converter element is inserted into the holding frame.

15 Claims, 2 Drawing Sheets

DEHUMIDIFIER MEANS AND A CHARGING STATION COMPRISING THE SAME

CROSS-REFERENCE TO PRIOR APPLICATION

Priority is claimed to German Patent Application No. DE 10 2020 112 925.4, filed on May 13, 2020, the entire disclosure of which is hereby incorporated by reference herein.

FIELD

The present invention relates to a dehumidifier means and a charging station comprising the same, in particular a charging station for charging electric vehicles.

BACKGROUND

The various charging stations in use around the world have to withstand climatic conditions. High air humidities and extreme temperatures can occur in the various regions of the world. Even during construction the components of the charging station can be negatively affected by the prevailing climatic conditions.

The new ISO standard 61851-1:2017 defines the framework conditions for a so-called "damp heat functional test" for conductive charging systems for electric vehicles, which correspondingly certified charging systems must pass. It describes that charging columns must be operated at high temperature cycles (25° C. to 40° C.) and a high air humidity (95%) for prolonged time cycles of several days. These temperature fluctuations and the high air humidity cause condensation within the charging columns, or charging stations, especially with regard to the cooling plates of the power electronics in the case of liquid-cooled systems. This humidity causes components to corrode more quickly and condensation water to collect in the base, which can be detected as a leak. Furthermore, the humidity contributes to a decrease in insulation, which can cause the insulation values to fall below the standard specifications. This circumstance is particularly problematic because as a result charging columns, or charging stations, may no longer be fit for service/operational and, in addition, short circuits may occur, which can destroy the electrical assemblies.

The power electronics of charging columns/charging stations used today are actively cooled, and the cooling device may be at the same location as the power electronics, i.e. for instance in the charging column, or it may be externally located as a central cooling device, which may be responsible for cooling a plurality of charging columns. Frequently, with steadily increasing charging currents, the charging cable is also cooled. Where there are temperature increases in the environment and high air humidity, the cooled parts offer initial attraction surfaces for the onset of condensation. Alternatively, there are also charging systems that do not use liquid cooling and seek to make do with air cooling.

Known from the publication WO 2016/198088 A1, for example, is a dehumidifier for a switchgear cabinet in which a Peltier element is used. A possible icing (icing problem) is prevented by reversing the polarity of the electric power supply of the Peltier element as a result of ascertainment of an icing condition for the heat sink. As a result, the cold side of the Peltier element heats up and the hot side cools down.

The document DE 10 2018 103 706 A1 discloses a charging system that has an integrated coolant reservoir. Fans are arranged in the upper part of the charging station, which provide air circulation in the region of the condenser, in which the gaseous, superheated refrigerant is cooled. Also provided in the upper region of the charging station, a liquid-air heat exchanger of the power electronics, by means of which heat is extracted from the air heated by the electronics inside the housing and transferred to the refrigerant.

The document EP 3 257 701 A2 discloses a charging column for an electric car having a "docking station" for receiving the charging plug when not in use, in which a Peltier element is arranged to cool the plug.

In addition, a charging station that has a Peltier element for liquid cooling is known from the document DE 10 2015 112 347 A1.

SUMMARY

In an embodiment, the present invention provides a dehumidifier means, comprising: an electrothermal converter element; and a collecting container, arranged beneath the electrothermal converter element, configured to collect condensate forming thereon, the collecting container having a drain through which the condensate from the collecting container is dischargeable out of the dehumidifier means.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
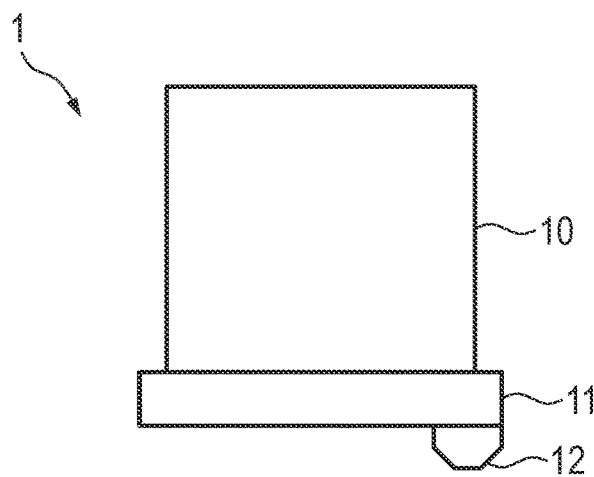
FIG. 1 shows a schematic structure of an exemplary dehumidifier means.

In an embodiment, the present invention provides a charging station whose components do not have problems with condensation water. In particular, condensation water does not cause the insulation measurements to give inadmissible values and thereby put the charging station out of operation.

In the context of this description, the term charging station may be understood to mean both a charging column that contains the power electronics, and a separate unit that comprises the power electronics and that is electrically coupled to at least one charging column. In the latter case, the charging column may provide a simple charging point and be electrically coupled, for example, to a "charge box" (charging box) in which the power electronics are contained and which thus performs the energy conversion and energy provision for the at least one charging column.

According to the invention, a dehumidifier means is provided, comprising an electrothermal converter element, and a collecting container, arranged beneath the electrothermal converter element, for collecting condensate (condensation water) forming thereon. The collecting container has a drain, through which the condensate from the collecting container can be discharged out of the dehumidifier means. The electrothermal converter element may, in particular, be a Peltier element, which in operation, i.e. when voltage is applied, has a cold side and a hot side. The current flowing through the Peltier element causes one side of the element to cool down (cold side) while the other side heats up (hot side). A Peltier element has the advantage that it requires little current and voltage, and thus little energy. Furthermore, it has no moving parts, which means that it works without mechanical wear and cannot sustain any mechanical damage, and it also does not generate any noise. The air can thus be dehumidified in a highly efficient manner.

During operation of the dehumidifier means, condensate forms on the cold side of the Peltier element, which is usually colder than the local environment, allowing the air in the local environment of the Peltier element to be dehumidified. The condensation water that forms on the surface of the cold side flows down the latter and collects in the collecting container. The collecting container may be arranged, in particular, under the cold side of the Peltier element. The accumulated condensation water can be drained out of the dehumidifier means through the drain.

According to further embodiments of the dehumidifier means, the dehumidifier means may further comprise a support plate on which a holding frame is arranged, wherein the electrothermal converter element is inserted into the holding frame. There may be electrical contacts arranged in the holding frame, which supply the electrothermal converter element with current when it is inserted. The electrical contacts on the holding frame may in turn be electrically connected to terminal contacts that are arranged separately on the support plate. Preferably, a high-voltage insulating layer, for example a high-voltage insulating foil, may be arranged between the holding frame and the support plate, such that the holding frame and the electrothermal converter element inserted therein are electrically insulated from the support plate. This feature is expedient, in particular, when the support plate is attached with its rear side (the side of the support plate opposite the holding frame) to another element in the charging station, for example to a cooling plate of the power electronics. Openings may also be provided in the support plate, such that it can be attached to another element within a charging station, for example by means of (at least) a screw connection.

According to further embodiments of the dehumidifier means, the surface of the electrothermal converter element that faces away from the support plate (and that is thus exposed to condensate formation) may have a three-dimensionally structured surface. The three-dimensionally structured surface may, for example, have a cone structure, a pyramid structure, a rod structure or a generally corrugated structure. The three-dimensionally structured surface serves to increase the surface area in order to provide a larger attraction surface for condensate formation. The three-dimensionally structured surface of the electrothermal converter element may be the surface of the cold side of the electrothermal converter element, or the surface of a condensation body thermally coupled to the cold side of the electrothermal converter element.

According to further embodiments, the dehumidifier means may further comprise a fan arranged in such a manner that, during operation of the dehumidifier means, an (outward) airflow generated thereby blows onto the surface of the electrothermal converter element (cold side) that faces away from the support plate. This may also mean that the airflow generated by the fan blows onto a condensation body mounted on the cold side. For example, the generated airflow may blow onto the surface of the electrothermal converter element that faces away from the support plate, on the three-dimensionally structured surface, in such a manner that icing is prevented, can occur to a reduced extent or can be reduced. As a result of the blowing onto the cold side of the electrothermal converter element, or of the condensation body attached to it, an increase in efficiency can be achieved in respect of air dehumidification. The fan may be fastened, for example by means of screw connections, to the electrothermal converter element bearing against the support plate. The fan may additionally be used to counteract icing on the cold side. In particular, when the fan power is high and the interior of the charging station is warm, the airflow emanating from the fan can heat the cold side and thus counteract icing, or reduce it again.

According to further embodiments of the dehumidifier means, the dehumidifier means may comprise a thermally conductive pad arranged, in the region of the electrothermal converter element, on a surface of the support plate that faces away from the latter (i.e. on the rear surface of the support plate). The thermally conductive pad may be used for improved thermal contact between the dehumidifier means and another element within the charging station, for example between the support plate and a cooling plate of the power electronics.

According to the invention, there is further provided a charging station for charging an electric vehicle, wherein the charging station comprises the dehumidifier means described herein. In this case, the drain of the dehumidifier means is fluidically coupled, for instance by means of a hose or a pipe, to an outlet that serves to discharge the condensate from the charging station, and that is preferably arranged in a base region of the charging station. By the base region of the charging station can be meant a region of the charging station close to the ground, in particular the contact surface of the charging station on the ground. Preferably, the drained condensation water can be released into the surrounding soil, such that the user of the charging station is not irritated by puddles. Furthermore, the gravitational effect may be utilized here to direct the formed condensate from the collecting container to the drain. In general, however, the primary objective of the charging station according to the invention may be to discharge the condensate, produced in the dehumidifier means, out of the charging station.

In order to ensure optimal dehumidification of the interior of the charging station, the components located inside the charging station may preferably be insulated from the environment, such that a microclimate is created inside the charging station. In this way, it can be achieved that more moisture is discharge to the outside than flows in from the outside (i.e. from the environment), such that the interior of the charging station is dehumidified in an effective manner.

Provision of the dehumidifier means in the charging station allows the interior of the charging station to be dehumidified, and thus corrosion can be avoided in the best possible manner. Furthermore, the occurrence of short circuits on the various components inside the charging station can also be prevented.

According to further embodiments of the charging station, the drain of the dehumidifier means may be arranged over a fan of the charging station, or may be conveyed by means of a fluid connection (e.g. hose or pipe) to a region over the fan of the charging station, such that, during operation of the charging station, the condensate flowing through the drain is discharged (trickled) onto the fan. In the case of this embodiment, the water extracted from the air can be conveyed to the outside with the airflow of the fan. It is advantageous in this case that the airflow is usually very warm (approximately 60° C.), and consequently the water evaporates rapidly. In the case of such an embodiment, a pump may be used if necessary, if the corresponding fan is arranged above the dehumidifier means.

According to further embodiments of the charging station, the dehumidifier means may be arranged in an upper region of the charging station. By an upper region of the charging station may be meant the upper third or the upper quarter of the interior of the charging station. Such an embodiment may be preferred if water-hazardous substances, for example glycol, are used inside the charging station, in order to maximize the distance of the dehumidifier means from ducts through which water-hazardous substances flow. In general, if water-hazardous substances are used, the dehumidifier means may be arranged, or shielded, in such a manner that, in the event of possible leakages of the water/glycol-carrying ducts, no glycol enters the dehumidifier means and is thus discharged into the environment. In addition, a separator may be used to prevent water-hazardous substances from escaping to the outside with the discharged condensate.

According to further embodiments of the charging station, the fan of the dehumidifier means may have an air supply connection, to which a hose can be coupled. Coupling of a hose to the air supply connection enables the air to be collected, for example, from where a high air humidity is to be expected, such that better/more reliable dehumidifying of the interior of the charging station can be achieved. In addition, a selective airflow within the charging station can be achieved in this way.

According to further embodiments of the charging station, the thermally conductive pad bearing against the support plate may bear against a cooling plate of a power electronics module of the charging station. In other words, the hot side of the electrothermal converter element may be thermally coupled, via the support plate and the thermally conductive pad attached thereto, to a cooling plate already present in the charging station, in order to dissipate the heat of the hot side. In this way, a greater heat flow can be achieved, which improves the cooling performance, as the temperature difference between the cold side and the hot side is greater and can also be established more rapidly.

It is understood that the features mentioned above and those yet to be explained below may be employed, not only in the combination indicated in each case, but also in other combinations or on their own, without departure from the scope of the present invention.

Represented in FIG. 1 is a schematic structure of an exemplary dehumidifier means 1. This has an electrothermal converter element 10, preferably a Peltier element, and a collecting container 11, arranged beneath the electrothermal converter element 10, for collecting condensate that forms thereon. The collecting container 11 has a drain 12, through which the condensate collected in the collecting container 11 can be discharged out of the dehumidifier means 1. The collecting container 11 may, in particular, be designed and arranged in such a manner that the condensate forming on the cold side of the converter element 10 can be collected therein. The cold side may be directly the surface of the electrothermal converter element 10 that has cooled down during operation of the dehumidifier means 1, or also a condensation body that is attached to the cold side and coupled thereto in a thermally conductive manner.

Figure 2:
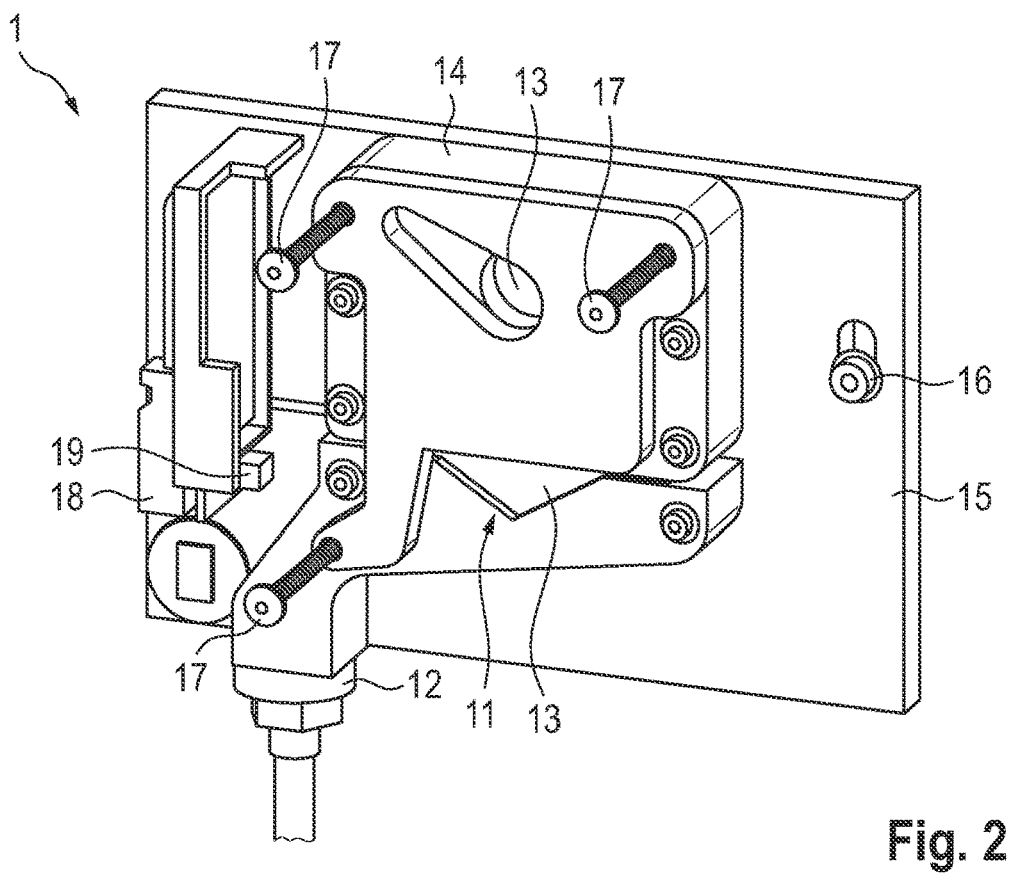
FIG. 2 shows an exemplary embodiment of the dehumidifier means.

FIG. 2 shows a specific component embodiment of the dehumidifier means 1. The dehumidifier means 1 is constructed on a support plate 15 on which, inter alia, a housing 14 and other components are arranged. A holding frame is arranged in the housing 14 for contacting the electrical contacts of the electrothermal converter element arranged in or on the holding frame. In the case of the exemplary embodiment of the dehumidifier means 1 represented in FIG. 2, arranged on the cold side of the electrothermal converter element there is a condensation body 13, which can be seen through the rear openings of the housing 14. The condensation body 13 in this case has a three-dimensional surface structure in the form of a rod-shaped or cone-shaped structure to increase its surface area. Located below the condensation body 13, in the lower part of the housing 14 (or as a separate component below the housing 14), is the collecting container 11 for collecting the condensate that forms on the cold surface of the condensation body 13. The condensate may ultimately be discharged from the dehumidifier means 1 via the drain 12. The support plate 15 may be attached to another component, for instance to a cooling plate of the power electronics or to an internal wall within a charging station, by means of a first screw 16 (although more first screws 16 may of course be used). The housing 14 is fastened to the support plate 15 by means of screws. Also represented are second screws 17, which serve to optionally fasten a fan (see FIG. 3) to the housing 14. Also provided is a connector 18, which is electrically coupled to corresponding contacts in the holding frame in the housing 14 and thus serves to provide energy for the electrothermal converter element. The represented inner contact 19 corresponds to a contact of a further plug connection for the electrical contacting of the fan.

Figure 3:
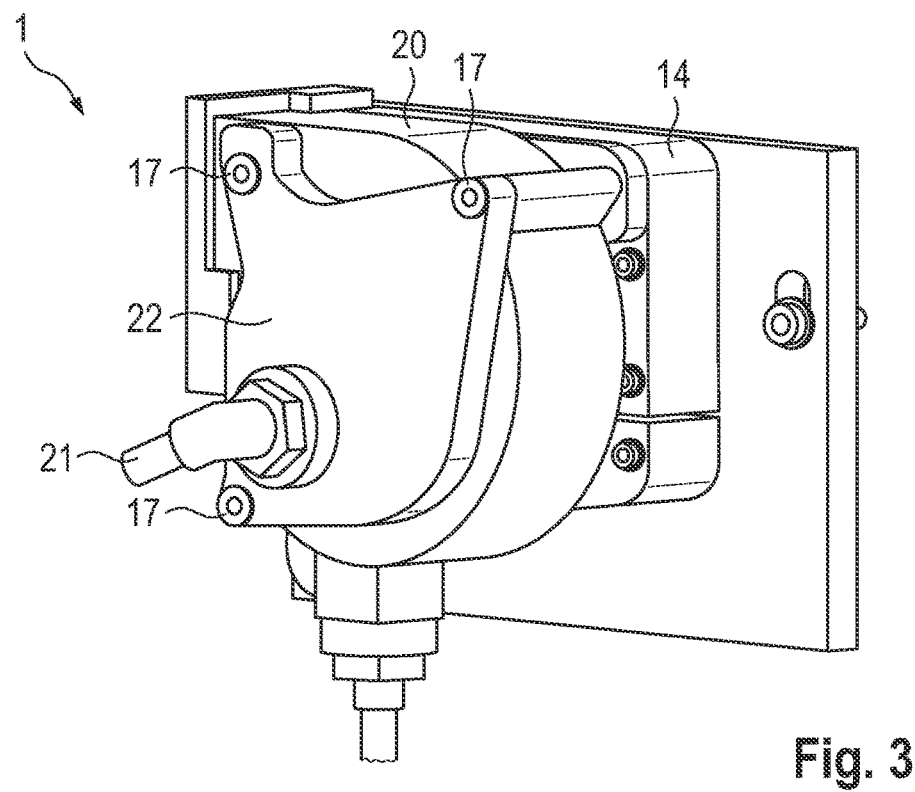
FIG. 3 shows an exemplary embodiment of the dehumidifier means with a fan.

FIG. 3 shows the exemplary embodiment of the dehumidifier means 1 represented in FIG. 2. Here, a fan 20 is additionally attached to the housing 14, in the example shown by means of the second screws 17. Furthermore, connected in front of the fan 20 (i.e. arranged in the air intake region of the fan), is an optional cover 22, in which an air supply connection 21 is provided. A hose can be connected to the air supply connection 21 in order to draw air from at least one predetermined region of the charging station. The hose connected to the air supply connection 21 may have a plurality of air supply openings.

Figure 4:
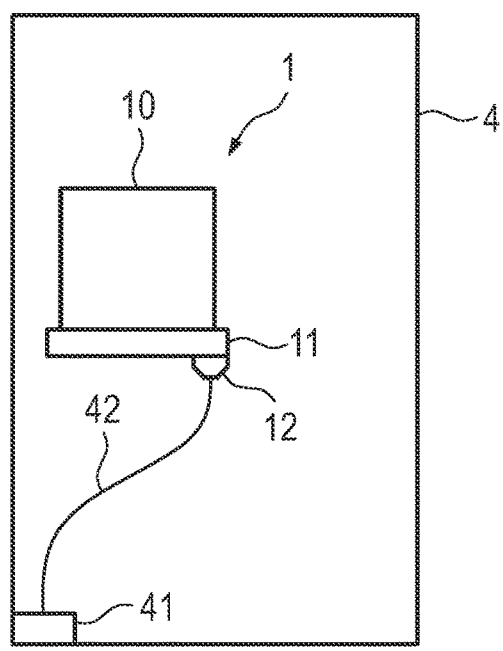
FIG. 4 shows an exemplary embodiment of a charging station, arranged in which there is a dehumidifier means.

Illustrated in FIG. 4 is an exemplary embodiment of a charging station 4 in which the dehumidifier means 1 is arranged. The drain 12 of the dehumidifier means 1 is fluidically connected to an outlet 41 of the charging station 4 by means of a hose, or a pipe 42. The outlet 41 in this case is preferably located in the base area of the charging station 4. This allows the collected condensate to be drained into the surrounding soil without forming puddles around the charging station 4. In addition, the condensate from the collecting container 11 is conveyed by gravity to the outlet 41, such that no energy is required for this process.

As an alternative to the disposal variant of the condensate represented in FIG. 4, it may be discharged, or trickled, over a fan provided in the charging station 4. The fan may preferably be one whose airflow leads to the outside, i.e. is conveyed out of the charging station. For this purpose, for example, either the drain 12 of the dehumidifier means 1 may be arranged over such a fan, in particular if the dehumidifier means is arranged above the fan. Alternatively, in particular if the dehumidifier means 1 is located beneath the fan, the condensate may be conveyed from the drain 12 by means of the pipe 42 to a region over the fan, in order to deposit the condensate onto the fan. A pump may be used to pump up the condensate.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A dehumidifier, comprising:
an electrothermal converter element; and
a collecting container arranged beneath the electrothermal converter element, and configured to collect condensate forming thereon, the collecting container having a drain through which the condensate from the collecting container is dischargeable out of the dehumidifier,
wherein the drain is arranged over a fan or comprises a fluid connection to a region over the fan such that the condensate is configured to be deposited onto the fan.

2. The dehumidifier of claim 1, further comprising:
a support plate on which a holding frame is arranged,
wherein the electrothermal converter element is inserted into the holding frame.

3. The dehumidifier of claim 2, wherein a surface of the electrothermal converter element that faces away from the support plate is a three-dimensionally structured surface.

4. The dehumidifier of claim 2, wherein:
the fan is arranged such that, during operation of the dehumidifier, an airflow generated thereby blows onto a surface of the electrothermal converter element that faces away from the support plate.

5. The dehumidifier of claim 2, further comprising:
a thermally conductive pad arranged, in a region of the electrothermal converter element, on a surface of the support plate that faces away from the electrothermal converter element.

6. A charging station for charging an electric vehicle, comprising:
the dehumidifier of claim 1.

7. The charging station of claim 6, wherein the dehumidifier is arranged in an upper region of the charging station.

8. The charging station of claim 6, wherein
the fan has an air supply connection, to which a hose is couplable.

9. The charging station of claim 6, wherein the dehumidifier further comprises a support plate on which a holding frame is arranged, the electrothermal converter element being inserted into the holding frame,
wherein the dehumidifier further comprises and a thermally conductive pad arranged, in a region of the electrothermal converter element, on a surface of the support plate that faces away from the electrothermal converter element, and wherein the support plate bears with the thermally conductive pad against a cooling plate of a power electronics module of the charging station.

10. The charging station of claim 6, wherein the drain is arranged in a base region of the charging station.

11. The dehumidifier of claim 1, further comprising a pump configured to pump condensate via the fluid connection to the region over the fan.

12. The charging station of claim 6, wherein the fan is configured to discharge condensate to an external environment.

13. The charging station of claim 8, wherein the hose is configured to draw air from at least one predetermined region of the charging station.

14. The charging station of claim 8, wherein the hose includes a plurality of air supply openings.

15. The dehumidifier of claim 1, further comprising:
a support plate coupled to the electrothermal converter element;
a condensation body comprising a three-dimensional structured surface and coupled to the electrothermal converter element; and
a housing, the electrothermal converter element and the condensation body arranged at least partially within the housing,
a fan coupled to the housing;
wherein the electrothermal converter element has a cold side and a hot side,
wherein the condensation body is coupled to the cold side of the electrothermal converter element in a thermally conductive manner, with the three-dimensionally structured surface facing away from the cold side;
wherein the hot side of the electrothermal converter element is coupled to the support plate in a thermally conductive manner,
wherein the fan is configured to blow air toward the three-dimensionally structured surface of the condensation body, and
wherein the collecting container is further configured to collect condensate formed on the three-dimensional structured surface of the condensation body.

* * * * *